United States Patent Office 3,491,589
Patented Jan. 27, 1970

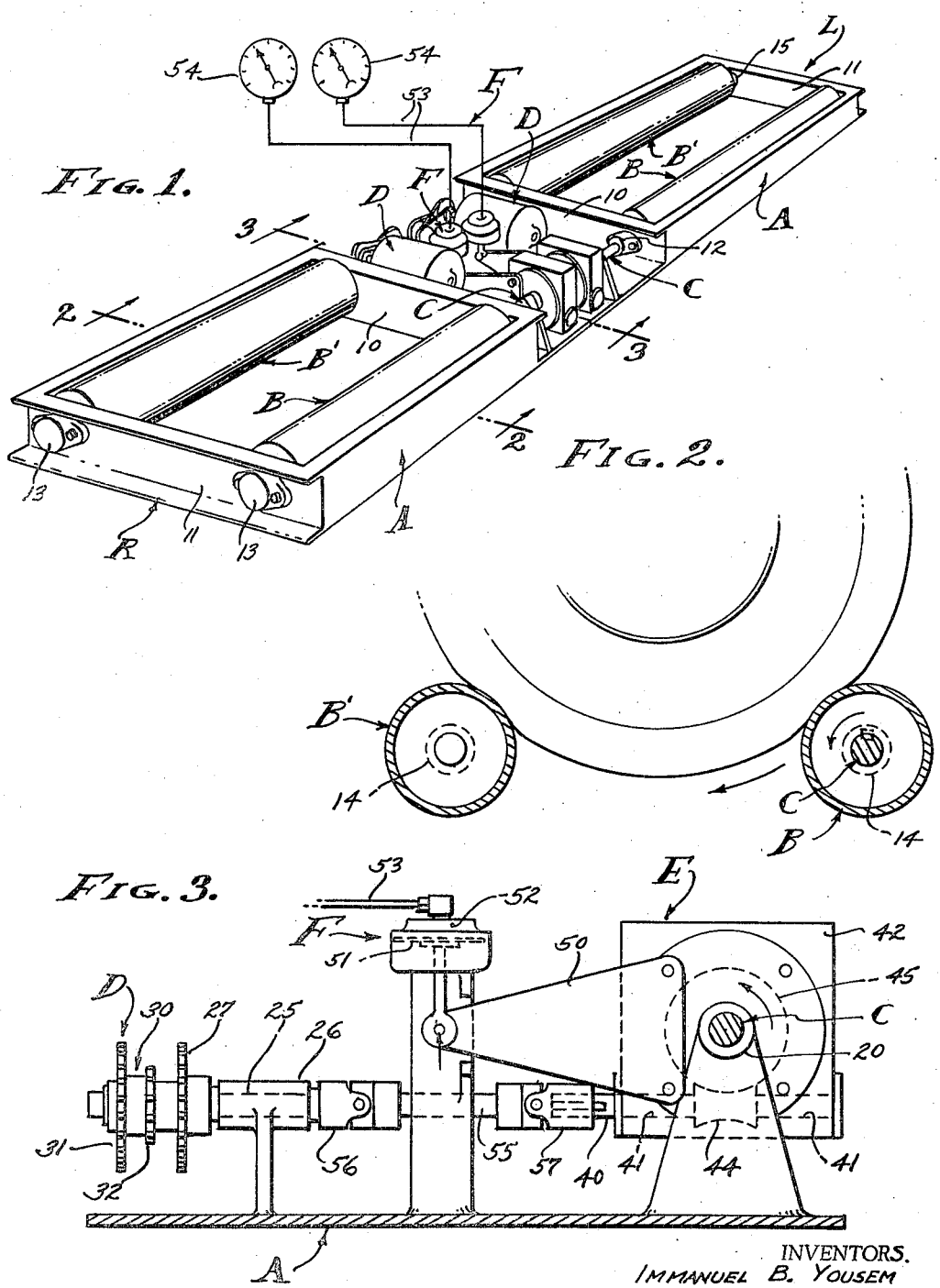

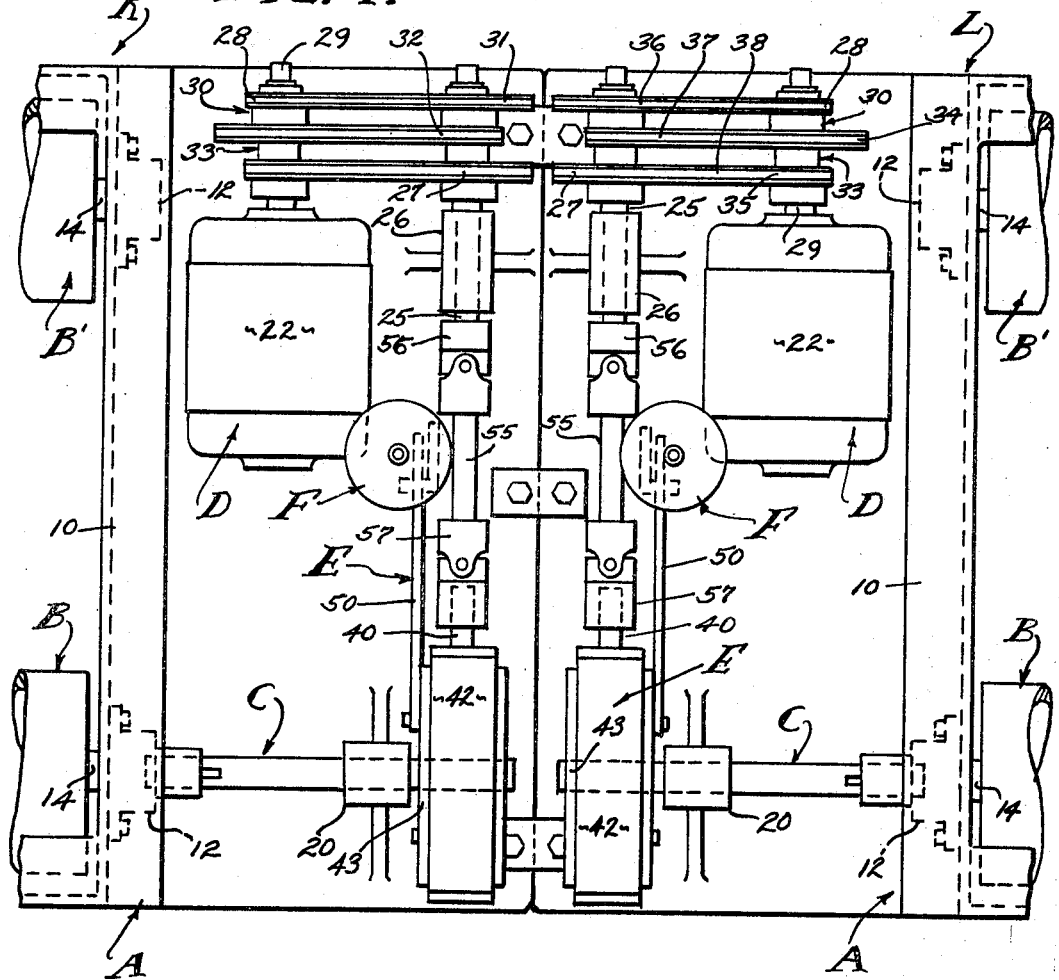
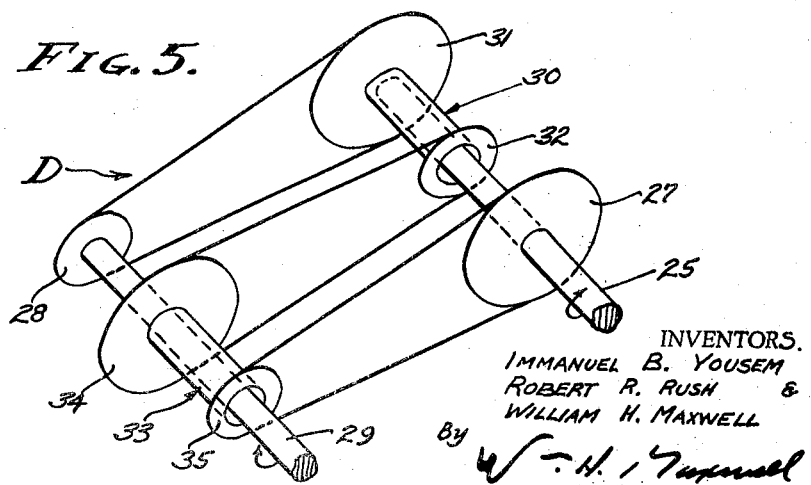

3,491,589
SEPARATE WHEEL BRAKE TESTER
FOR VEHICLES
Immanuel B. Yousem, Los Angeles, Robert R. Rush, Burbank, and William H. Maxwell, Los Angeles, Calif., assignors, by mesne assignments, to Alan E. Wyckoff and Immanuel B. Yousem, doing business as Dura-Test Manufacturing Co., Los Angeles, Calif.
Filed Jan. 15, 1968, Ser. No. 697,938
Int. Cl. G01l 5/28
U.S. Cl. 73—126                                12 Claims

ABSTRACT OF THE DISCLOSURE

This invention relates to the testing of vehicle brakes and especially those of the separate wheels at each opposite side of the vehicle. The testing conditions are dynamic and simulate movement of the vehicle while it is at rest for analytical observation and while the vehicle braking system pressure is applied, resulting in torque created by said application and which is displayed for observation. These objectives are provided in a unitized structure that is combined of two independently operable wheel units, and each of which is operable to drive and to transmit torque readings from the separate vehicle wheels engaged thereon for testing. The arrangement of the combination in unique and inherently space saving in its concept, in that all drive elements, torque transmitting elements, and pressure sensors are located intermediate the active wheel engaging rollers so as to occupy no more than the normally unused space within the confines of the tread of smaller conventional four wheeled vehicles, and as well so as to accommodate the tread width of large vehicles, including dual tired trucks. It is the normal operation of vehicles in a forward direction, rotation of the wheels thereof, with which the present invention is concerned, and in such manner as to evidence irregularity as well as regularity of operation of the brakes that are applied in a normal manner from the vehicle braking system, and all with utmost safety and virtually no chance of danger to the equipment or vehicle under test.

---

Brake analysers are widely used in the servicing of automobiles and trucks and the like, it being a primary object to detect the adequacy of the vehicle braking system through simulation of braking conditions. False security for the driver of such vehicles can result from questionable test results, and it is for this reason that the braking function must be slowed down, so to speak, for discriminate inspection. Therefore, the dynamic range of wheel revolutions per minute is placed advantageously in the low range by the present invention, and to the end that a careful detailed inspection is made possible. Further, with respect to correctness of test readings, the torque effected by braking is accurately displayed at low speed and all without influencing affect from the prime mover that drives the wheel being tested. Accordingly, the prime mover that causes simulation of the travel of the vehicle relative to the supporting pavement is isolated from the torque sensing drive and to the end that accurate torque values are obtainable at low revolutions per minute, for example at 5 to 20 r.p.m. Therefore, it is a general object of this invention to provide a pair of conventional wheel supporting rollers at each separate wheel of the vehicle, and a prime mover for driving at least one roller of each pair through an isolated speed reducing transmission and with a torque transmitting means for the remote observation of braking effect.

It is an object of this invention to provide a brake tester for displaying the braking effort of independent vehicle wheels at a low speed range and at which discriminate observations can be made as to the uniformity of braking action and not subject to the generation of high heat values that would result in brake "fading." Therefore, it is the fundamental and primary braking characteristics that are to be tested for, and which are the precedent requirements to good brakes, and not secondary braking characteristics which would necessarily be inadequate in the event that said primary requirements did not prevail. That is, it is to be determined at the outset that good and fundamentally sound brakes exist at each vehicle wheel.

Another object of this invention is to advantageously consolidate the mechanisms of separate wheel testing units in a brake tester of the character described, in an arranged combination that makes for the feasibility of one central location for the mechanisms and which eliminates all mechanisms from the usual location at the outer ends of the rollers. Consequently, the instant brake tester is no wider than the largest vehicle track to be tested whereby installation in an alley or throughway of minimum width is made possible.

It is still another object of this invention to provide a brake tester of the character thus far described that is a knock-down assembly of two opposite units, one operable in connection with each opposite wheel of a vehicle, front or back wheels as the case may be and whether or not the axle is live or free wheeling. With the present invention, power is applied by the tester and the braking effort capabilities of the separate vehicle brakes are observed simultaneously, the two units operating in unison and one without influence on the other.

The various objects and features of this invention will be fully understood from the following detailed description of the typical preferred form and application thereof, throughout which description reference is made to the accompanying drawings, in which:

FIG. 1 is a perspective view of the combined brake tester units as they are juxtapositioned for the tractive engagement of the spaced wheels of a vehicle. FIG. 2 is an enlarged sectional view taken as indicated by line 2—2 on FIGURE 1, showing a vehicle wheel engaged by rollers for driving engagement. FIG. 3 is a sectional view taken as indicated by line 3—3 on FIG. 1, showing the essential elements of the drive and torque transmitter and sensor means. FIG. 4 is a plan view of the brake tester as shown in FIG. 1, and FIG. 5 is a perspective diagram of the speed reduction means applied to the power shaft of the tester units.

The separate wheel brake tester for vehicles herein disclosed is unitized and comprises right and left brake testing units R and L, one for the right wheel and one for the left wheel of a vehicle to be tested. The opposite side wheels of even the smallest vehicles are substantially spaced and it is the tread distance space intermediate two spaced side wheels that is employed for the occupancy for the operating mechanisms, all as hereinafter described. However, the said right and left brake testing units R and L are dependent one upon the other for proper testing of vehicle brakes, in simulating a normal travel condition in which, for example, rolling resistance, brake drag, brake operation delay, self-engaging and grabbing, slippage, and the torque of brake effort applied, are comparative factors when comparing opposite side braking of the vehicle. The right and left brake testing units R and L cooperate in combination while operating independently for said comparative analysis of opposite wheel brakes of the vehicle. In practice, therefore, the right and left units are alike and are preferably mirror opposites, a description of one sufficing for a description of the other.

As shown, a typical vehicle has a pair of front wheels and a pair of back wheels each of which wheels is equipped with a brake and responsive to a master control, most often the master cylinder of a hydraulic pressure actuating system operable through manual movement of a foot pedal. It is to be understood that the brake control systems of vehicles vary widely and that each brake is separately operated to apply braking effort to the wheel with which it is connected. Specifically, each brake is engineered for its environment and for this reason will have certain known characteristics. However, the hereinabove mentioned comparative factors will exist with respect to each and every brake and all of which can be sensed through the observation of torque transmitted as a result of braking effort applied against a source of power produced by the brake testing unit. As it is illustrated throughout the drawings, each brake testing unit comprises, generally, a frame A, a pair of wheel engagement rollers B and B', a drive shaft C, a prime mover D, a drive and torque transmitter E, and sensor means F for receiving and equalizing the transmitted torque and for displaying it for observation.

The frame A is horizontal and disposed transversely of the alley or through-way along which the vehicle to be tested is directed, either forwardly or backwardly. Frame A is shown as involving spaced and parallel inner and outer side members 10 and 11, joined by rails, and between which the rollers B and B' operate on antifriction bearings 12 and 13 carried by the inner and outer side members respectively. In each instance, the inner end of the roller has projecting trunnions 14 and 15 that have support in the respective bearings 12 and 13. The rollers B and B' are thereby revolvable on spaced parallel axes, with their upper peripheries exposed at and preferably above the top plane of the frame A. The spacing of the roller axes can vary depending upon the desired depth of penetration of the tested wheel, and each roller is free to revolve independent of the other and to track with the wheel being tested.

The drive shaft C is coupled to and extends inward from the forward roller B, and it is this shaft which powers said forward roller. It is significant that this forward roller B is employed to drive the vehicle wheel being tested, the upper periphery of said roller being driven rearwardly to track with and pull the vehicle wheel rearward and thereby simulating forward motion of the vehicle. The shaft C can be rigid with the roller B and cantilevered therefrom for support of the means F, or as is preferred the shaft C is a stub-shaft having keyed engagement with the inner end of roller B for support and carried at its inner end portion by a bearing 20. In each instance, the bearings 12, 13 and 20 are self-aligning anti-friction bearings that permit considerable flexibility in the overall structure of the brake tester.

The prime mover D is provided to apply the power necessary for the dynamic operation of the brake tester. That is, it is the powered turning of the roller B that is necessary, at a relatively slow rate and at a steady predetermined speed. The prime mover D is shown as an electric motor 22 operable to revolve a power shaft 25, it being significant that the power shaft 25 is disposed in a plane normal to and at a right angle with respect to the drive shaft C. The motor 22 can be any motor operating the power shaft 25 at the required speed, and in practice the speed of shaft 25 is geared down from the motor speed, in which case the motor 22 can be a gear-head motor. As shown, the motor is offset laterally from the power shaft 25, on an axis parallel thereto and coupled by a speed reducer. In this instance the power shaft is supported as an arbor upon bearings 26 and has a driven member 27 powered from a drive member 28 on the motor shaft 29. In order to realize a substantial reduction in speed, there is a primary reduction element 30 journaled to turn free on the axis of power shaft 25 and there is a secondary reduction element 33 journaled to turn free on the axis of motor shaft 29. Primary reduction element 30 fixedly relates a large driven member 31 and a small drive member 32, while secondary reduction element 33 fixedly relates a large driven member 34 and a small driving member 35. Said members can be gears, pulleys or sprocket or the like, and in practice they are the latter with drive chains 36, 37 and 38 extending sequentially between the members. In practice the smaller members 28, 32 and 35 are alike and/or identical while the larger members 27, 33 and 34 are alike and/or identical. Therefore, the chains 36, 37 and 38 are also alike and/or identical, and to the end, for example, that a two to one ratio at each of the three reduction stages results in an eight to one ratio between shaft 29 and shaft 25.

The drive and torque transmitter E is provided in accordance with this invention to serve the two principal functions of firstly driveably revolving the drive shaft C and of secondly yieldingly pressuring the sensor means F. As to the first function, the means E is a driving transmission and involves right angular gearing wherein the input torque does not influence the output torque. As to the second function, the means E is a principal element and namely the lever arm of a "prony brake" or dynamometer, virtually uninfluenced by the input torque and sensitive to the output torque.

Referring now to the driving transmission function of the drive and torque transmitter E, there is an input shaft 40 that turns an output shaft, the shaft C. Shafts 40 and C are right angularly related, the input shaft 40 being journaled on bearings 41 in a case 42 that is cradled on the axis of shaft C. In practice, the shaft C is also journaled on bearings 43 in the case 42, thereby providing sole support for the case and permitting the case to revolve freely if not restrained. Consequently, the input torque is in a plane disposed in a right angle to the output torque, and the bearings 43 provide the anchor to restrain the input torque. In practice, the right angle gearing is a worm 44 on the input shaft 40 engaged with a wheel 45 on the output shaft C, the latter shaft being secured in its operative position by the stub shaft of the roller B and the bearing 20.

Referring now to the "prony brake" or dynamometer function of the drive and torque transmitter E, the combination of shafts C and 40 and cradled support of the case 42 inherently establishes a lever arm 50 sensitive only to torque imposed upon the shaft C. As shown, the arm 50 is fixed to the case 42 to extend radially of shaft C and requires the restraint of an anchor or the like in order for the input shaft 40 to transmit rotation to shaft C. Thus, restraint of lever arm 50 as hereinafter described serves to render the driving transmission function effective.

As hereinabove described, the drive and torque means E comprises but one static element in the case 42, and but two active elements in the worm 44 and wheel 45. The desired gear reduction is gained in one stage, for example a twenty to one ratio, and being a worm gear drive the input shaft 40 is offset from the output shaft C. In accordance with the invention, the case 42 of means E has a normal positioning within a limited range of rotation, in which case the axis of input shaft 40 is more or less stationary. However, the axis of input shaft 40 does oscillate as the case 42 revolves in response to torque applied. Therefore, the means axis position of input shaft 42 is closely aligned with the axis of power shaft 25, both of which are in a plane normal to the axis of shaft C, and the two shafts are driveably coupled by a universal shaft 55. The shaft 55 is a telescoping shaft with universal connections 56 and 57 at its opposite ends, universal 56 being fixed onto power shaft 25 and universal 57 being slideably keyed to the input shaft 40. Thus, the prime mover torque is transmitted into the driving transmission of means E to be applied to the drive shaft C and to the forward roller B, while the case 42 and lever arm 50 remain sensitive to torque imposed upon the shaft C and roller B.

In carrying out the present invention the sensor means F is provided to restrain the lever arm 50 and revolvable case 42, and to sense and display the torque imposed. The means F is preferably a hydraulic means, a means involving the capture of a body of fluid, preferably liquid, and adapted to simultaneously supply the necessary bias and readable display of the braking pressures applied to the roller B. That is, the means F establishes the necessary equilibrium by anchoring the lever arm 50 and case 42 within the limited range of movement above referred to, while converting mechanical force or pressure into transmittable fluid pressure. In its preferred form the means F involves diaphragm 51 depressed by the lever arm 50 there being a sealed fluid system behind the said diaphragm. The fluid system involves a body 52 of substantially incompressible liquid captured in a chamber open into a transmission tube 53 that transmits it to one or more pressure sensitive gages 54. In practice, the gage or gages 54 are biased against the application of fluid pressure in tube 53 and permit but a small movement of fluid. Consequently, the captured liquid body 52 is subject to but a small displacement, so that the movement of lever arm 50 and misalignment of input shaft 40 and power shaft 20 is inconsequential.

From the foregoing it will be seen that a compact combination of parts and elements is provided. The prime mover D is advantageously disposed on a fore and aft axis alongside the inner side member 10 and is overlapped by the case 42 of the drive and torque transmitter E and/or by the lever arm 50 thereof. Further, the said arm 50 advantageously overlies the offset position of the power shaft 25 and input shaft 40, the said two shafts being substantially aligned and coupled by means of the universal shaft 55. Therefore, the transverse space requirement of the entire mechanism is confined to the width of the prime mover and the power output shaft that extends alongside thereof, or an equivalent arrangement; it being the right angular relationship of the input shaft 40 to the drive shaft C which is significant and which makes possible the static mounting of the prime mover and torque transmission without adverse effect to the torque imposed upon the drive shafts C through the braking effect applied to the roller B in driving connection therewith. Further, the two like and/or identical mirror opposite units are juxtapositioned, inner end to inner end, and fastened together and/or down as indicated, in which case a combination of brake testing units is provided for the simultaneous testing of vehicle wheel brakes. The power controls and calibration of dials on the gages 54 can be provided for and arranged, all as circumstances require.

Having described only a typical preferred form and application of our invention, we do not wish to be limited or restricted to the specific details herein set forth, but wish to reserve to ourselves any modifications or variations that may appear to those skilled in the art:

Having described our invention, we claim:

1. A brake tester unit for the separate wheels of a vehicle and including, a substantially rigid transversely disposed frame with interconnected inner and outer side members, a pair of spaced horizontal disposed vehicle wheel engaging rollers journaled in the side members to turn free therebetween, a drive shaft extending from the inner end of one roller, a prime mover statically mounted in the frame and with a power shaft disposed at a right angle to the drive shaft and adjacent the side member from which the drive shaft projects, a drive and torque transmitter comprising a case cradled on the drive shaft axis, an input shaft disposed at a right angle to the drive shaft and flexibly coupled to said power shaft, and two rotatably engaged torque transmitting elements driveably fixed on the drive shaft and input shaft respectively and within said case, and sensor means restraining cradled movement of the case and displaying torque imposed upon the shaft connected roller by the vehicle wheel.

2. The brake tester unit as set forth in claim 1, wherein the drive shaft extends transversely by the prime mover, and wherein the power shaft extends adjacent and parallel to the prime mover at the side thereof opposite the inner side member to which it is adjacent.

3. The brake tester unit as set forth in claim 1, wherein the drive shaft extends transversely by the prime mover and is carried at its end portion by a bearing support, and wherein the power shaft and flexibly coupled input shaft extend adjacent and parallel to the prime mover at the side thereof opposite the inner side member to which they are adjacent.

4. The brake tester unit as set forth in claim 1 and wherein the rotatably engaged torque transmitting elements of the drive and torque transmitter are cooperatively engaged speed reducing elements, from the input shaft to the drive shaft.

5. The brake tester unit as set forth in claim 1 and wherein the prime mover comprises a motor shaft with the said power shaft offset laterally therefrom and speed reducer means extending between the two shafts.

6. The brake tester unit as set forth in claim 1, wherein the drive shaft extends transversely by the prime mover, wherein the power shaft extends adjacent and parallel to the prime mover at the side thereof opposite the inner side member to which it is adjacent, and wherein the prime mover comprises a motor shaft with the said power shaft offset laterally therefrom and speed reducer means extending between the two shafts.

7. Combined brake tester units for the separate testing of opposite side wheels of a vehicle, there being two transversely disposed units juxtapositioned inner end to inner end, and each unit including, a substantially rigid transversely disposed frame with interconnected inner and outer side members, a pair of spaced horizontal disposed vehicle wheel engaging rollers journaled in the side members to turn free therebetween, a drive shaft extending from the inner end of one roller, a prime mover statically mounted in the frame and with a power shaft disposed at a right angle to the drive shaft and adjacent the inner side member from which the drive shaft projects, a drive and torque transmitter comprising a case cradled on the drive shaft axis, an input shaft disposed at a right angle to the drive shaft and flexibly coupled to said power shaft, and two rotatably engaged torque transmitting elements driveably fixed on the drive shaft and input shaft respectively and within said case, and sensor means restraining cradled movement of the case and displaying torque imposed upon the shaft connected roller by the vehicle wheel, the said drive shafts, prime movers, drive and torque transmitters, and sensor means of the two units being accommodated intermediate the two said inner side members of the two units respectively.

8. The combined brake tester units as set forth in claim 7, wherein the drive shafts extend transversely by the prime movers, and wherein the power shafts extend adjacent and parallel to the prime movers at the sides thereof opposite the inner side members to which they are adjacent.

9. The combined brake tester units as set forth in claim 7, wherein the drive shafts extend transversely by the prime movers and are carried at their end portions by bearing supports, and wherein the power shafts and flexibly coupled input shafts extend adjacent and parallel to the prime movers at the sides thereof opposite the inner side members to which they are adjacent.

10. The combined brake tester units as set forth in claim 7 and wherein the rotatably engaged torque transmitting elements of the drive and torque transmitters are cooperatively engaged speed reducing elements, from the input shafts to the drive shafts.

11. The combined brake tester units as set forth in claim 7 and wherein the prime movers each comprise a motor shaft with the said power shaft offset laterally therefrom and speed reducer means extending between the two shafts.

12. The combined brake tester units as set forth in claim 7, wherein the drive shafts extend transversely by the prime movers, wherein the power shafts extend adjacent and parallel to the prime movers at the sides thereof opposite the inner side members to which they are adjacent, and wherein the prime movers each comprises a motor shaft with the said power shaft offset laterally therefrom and speed reducer means extending between the two shafts.

References Cited

UNITED STATES PATENTS

| | | | |
|---|---|---|---|
| 1,848,457 | 3/1932 | Bendix | 73—126 |
| 1,920,263 | 8/1933 | Langbein | 73—126 |
| 2,613,544 | 10/1952 | Cullman | 74—219 |

JERRY W. MYRACLE, Primary Examiner